(12) United States Patent
Hayama

(10) Patent No.: US 8,569,697 B2
(45) Date of Patent: Oct. 29, 2013

(54) LIQUID CRYSTAL PANEL, LIQUID CRYSTAL DISPLAY DEVICE, AND METHOD FOR INSPECTING SEALING RESIN

(75) Inventor: Takafumi Hayama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 18 days.

(21) Appl. No.: 13/388,248

(22) PCT Filed: Apr. 27, 2010

(86) PCT No.: PCT/JP2010/057437
§ 371 (c)(1),
(2), (4) Date: Jan. 31, 2012

(87) PCT Pub. No.: WO2011/040076
PCT Pub. Date: Apr. 7, 2011

(65) Prior Publication Data
US 2012/0127457 A1    May 24, 2012

(30) Foreign Application Priority Data

Sep. 30, 2009   (JP) .................................. 2009-227531

(51) Int. Cl.
*G01J 5/00*    (2006.01)

(52) U.S. Cl.
USPC ........................................................ 250/338.1

(58) Field of Classification Search
USPC ......... 250/338.1–338.5, 339.01–339.15, 340, 250/341.1–341.8
See application file for complete search history.

(56) References Cited

U.S. PATENT DOCUMENTS

| 6,118,509 A | 9/2000 | Miyake |
| 6,281,498 B1 * | 8/2001 | Fellows .................... 250/339.06 |
| 6,875,985 B2 * | 4/2005 | Skelton ...................... 250/341.1 |

FOREIGN PATENT DOCUMENTS

| JP | 5-45288 A | 2/1993 |
| JP | 11-249157 A | 9/1999 |
| JP | 2001-154208 A | 6/2001 |
| JP | 2001-235758 A | 8/2001 |

* cited by examiner

*Primary Examiner* — Kiho Kim
(74) *Attorney, Agent, or Firm* — Birch, Stewart, Kolasch & Birch, LLP

(57) ABSTRACT

A liquid crystal panel (10) comprises a liquid crystal injection port (12) for injecting liquid crystal between a pair of substrates, wherein a metal pattern (16) capable of reflecting infrared is provided in a region for providing a sealing resin for sealing the liquid crystal injection port (12).

16 Claims, 11 Drawing Sheets

F I G. 5
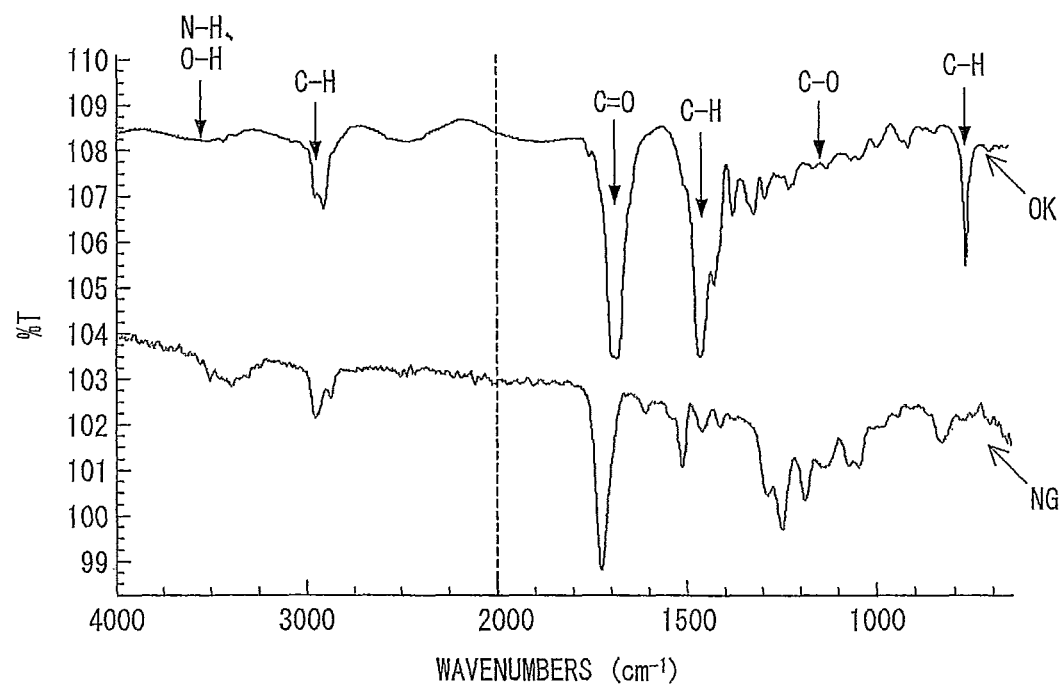

FIG. 7
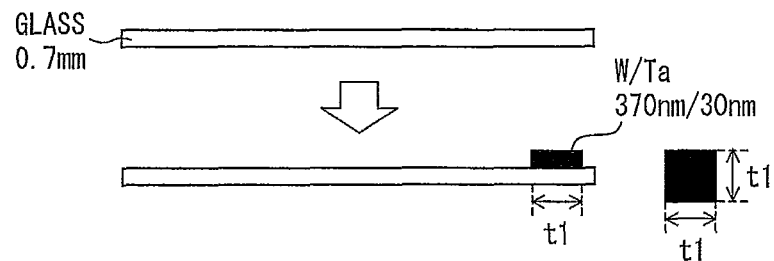
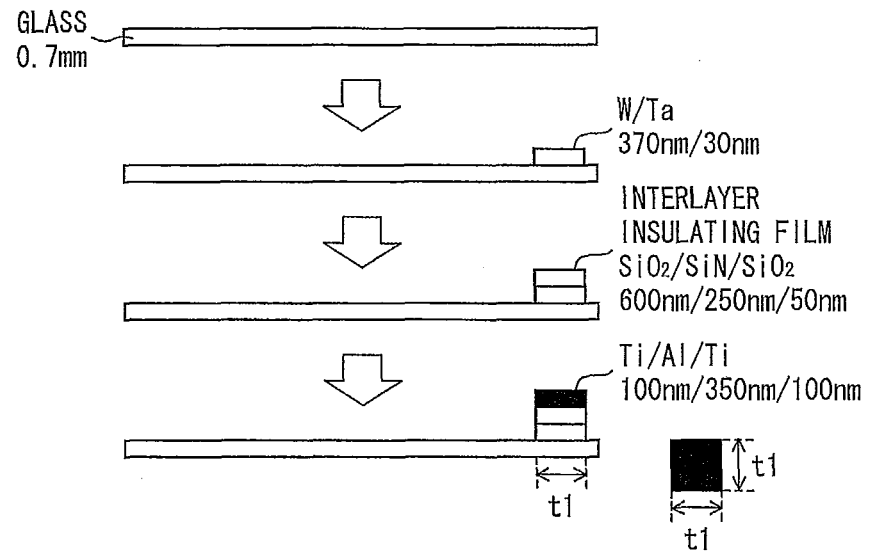

LIQUID CRYSTAL PANEL, LIQUID CRYSTAL DISPLAY DEVICE, AND METHOD FOR INSPECTING SEALING RESIN

BACKGROUND OF THE INVENTION

1. Field of the Invention

The present invention relates to manufacturing techniques of a display device such as a liquid crystal display device, and, in particular, to a technique for inspecting sealing at a liquid crystal injection port of a liquid crystal panel.

2. Description of the Related Art

A liquid crystal panel is manufactured by injecting a liquid crystal material between two glass substrates. In a common manufacturing method of a liquid crystal panel, electrode patterns and an alignment film are formed on each of the two glass substrates and then a sealing material and spacers are disposed therebetween. Subsequently, the substrates are assembled together, whereby liquid crystal cells are formed. Then, liquid crystal is injected into the liquid crystal cells defined by the sealing material and then an injection port is sealed. In this way, a liquid crystal panel is manufactured.

In the above-described manufacturing method of a liquid crystal panel, the liquid crystal is generally injected by a vacuum injection method, and, after the injection of the liquid crystal, sealing resin such as an ultraviolet cure resin is applied in the vicinity of a liquid crystal injection port and irradiated with ultraviolet for curing the sealing resin to seal the liquid crystal injection port.

In the process for sealing the liquid crystal injection port, if, for example, the sealing resin is not completely cured or the sealing resin contains impurities, the uncured sealing material or the impurities would tend to gradually diffuse into the liquid crystal. And in a portion where the uncured sealing material or the impurities is/are diffused, of the liquid crystal panel, characteristics such as voltage-transmittance or specific resistance would be deteriorated. The deteriorated characteristics of the liquid crystal would lead to a degradation of display performance or local variation of luminance (luminance unevenness in the injection port) in the vicinity of the injection port of the liquid crystal panel. Accordingly, it is required to completely cure the sealing resin in the process for sealing the liquid crystal injection port.

For example, Patent Literature 1 discloses a liquid crystal display device in which a sealing material having invaded between a pair of glass substrates is cured so that the uncured part is not remained, in order to avoid a display failure resulting from the uncured sealing material. Particularly, a transmission section through which ultraviolet or a visible light can transmit is provided in light shielding films or wires in the vicinity of the injection port on at least one substrate, and the sealing material is sufficiently irradiated with ultraviolet or visible light transmitted through the transmission section. Therefore, the sealing material in the injection port is cured.

CITATION LIST

Patent Literature 1

Japanese Patent Application Publication Tokukaihei No. 11-249157 A (Publication Date: Sep. 17, 1999)

SUMMARY OF INVENTION

Technical Problem

Although various approaches have been considered for completely curing a sealing resin, as described in Patent Literature 1, there has been no method so far for checking the state of cure of the sealing resin immediately after liquid crystal is injected and cured, that is, whether or not the sealing resin is surely and completely cured. In other words, a measure for improving application and cure conditions of a sealing resin has been considered, but not one for immediately checking the state of cure of the resin after sealing. Hence, immediately after the resin is injected and cured, abnormality in cure condition cannot be found and can only be recognized through observation of phenomenon of unevenness in the injection port in a lighted panel inspection process or after arrival of the product on the market.

That is to say, there exists conventionally a time lag until abnormality can be recognized, because an immediate check of the state of cure of the sealing resin in the vicinity of the injection port of the liquid crystal panel is not possible.

This means that, in case of a failure occurred in a process for injecting liquid crystal, feedback to devices of a line in the injection process is carried out with a time lag. And, due to the time-lagged feedback, preventing proliferation of the defect is difficult.

The present invention has been accomplished in view of the above-mentioned conventional problem, and an object of the present invention is to provide a liquid crystal panel, a liquid crystal display device comprising the liquid crystal panel, and a method for inspecting a sealing resin, in each of which, immediately after the sealing resin is injected and cured in a production of the liquid crystal panel, the state of cure of the sealing resin can be checked.

Solution to Problem

In order to attain the object, a liquid crystal panel according to the present invention is a liquid crystal panel including: a pair of substrates disposed opposite to each other; an liquid crystal injection port for injecting liquid crystal between the pair of substrates, and an infrared reflector capable of reflecting infrared, the infrared reflector being provided in a region for providing therein a sealing resin for sealing the liquid crystal injection port.

According to the configuration, the infrared reflector capable of reflecting infrared is provided, in particular, applied in the region for providing therein the sealing resin.

Accordingly, after the sealing resin has been applied, infrared is emitted through the sealing resin and reflected by the infrared reflector so as to be detected (measured).

Then, the infrared is analyzed as to its spectral intensity and the like. The analysis makes it possible to determine the state of cure of the sealing resin and whether or not impurities are incorporated in the sealing resin.

Consequently, a check of the state of cure and the like of the sealing resin is possible without the liquid crystal panel being lighted.

Therefore, the liquid crystal panel according to the configuration can be provided in which the state of cure and the like of the sealing resin can be checked immediately after the sealing resin is injected and cured, in a production of the liquid crystal panel.

In order to attain the object, a method for inspecting a sealing resin according to the present invention is a method for inspecting a sealing resin provided to seal a liquid crystal injection port of a liquid crystal panel including a pair of substrates disposed opposite to each other; and the liquid crystal injection port for injecting liquid crystal between the pair of substrates, the method comprising the step of: measuring infrared light by using a Fourier transform infrared spectrophotometer, the infrared light being transmissive through the sealing resin and being reflected by an infrared reflector capable of reflecting infrared, the infrared reflector being provided in a region for providing therein the sealing resin for sealing the liquid crystal injection port.

According to the method, an easy check of an internal state of the sealing resin (such as the state of cure of the sealing resin or whether or not impurities are incorporated in the sealing resin) is possible by measuring the infrared light reflected by the infrared reflector and transmitted through the sealing resin.

Hence, the state of the sealing resin can easily be checked immediately after the processes: the liquid crystal is injected, the liquid crystal injection port is sealed with the sealing resin, and the sealing resin is cured with ultraviolet.

Accordingly, even if an accidental trouble in a production process occurs, the trouble can immediately be solved by a prompt counter measure and feedback to the process. It can lead to an increase in production efficiency to improve the yield.

Further, according to the method, it is possible to check the state of the sealing resin in a nondestructive manner without touching the liquid crystal panel.

Consequently, the check of the state of the sealing resin can hardly damage the liquid crystal panel.

Advantageous Effects of Invention

As described above, the liquid crystal panel according to the present invention has a configuration such that an infrared reflector capable of reflecting infrared is provided in a region for providing therein a sealing resin for sealing a liquid crystal injection port.

Further, the method for inspecting a sealing resin according to the present invention is a method comprising: measuring infrared light by using a Fourier transform infrared spectrophotometer, the infrared light being transmissive through the sealing resin and being reflected by an infrared reflector capable of reflecting infrared, the infrared reflector being provided in a region for providing therein the sealing resin for sealing the liquid crystal injection port.

Therefore, the present invention has an effect that the state of cure and the like of the sealing resin can be checked immediately after the sealing resin is injected and cured in a production of the liquid crystal panel.

BRIEF DESCRIPTION OF DRAWINGS

FIG. 5 is a graph illustrating examples of spectra of a good state of cure and a no-good state of cure, of the sealing resin.

FIG. 7 is illustrations of aspects in which a metal pattern is formed on a substrate.

DETAILED DESCRIPTION OF THE INVENTION

Embodiments of the present invention are described in detail below with reference to the attached drawings.

Figure 1:
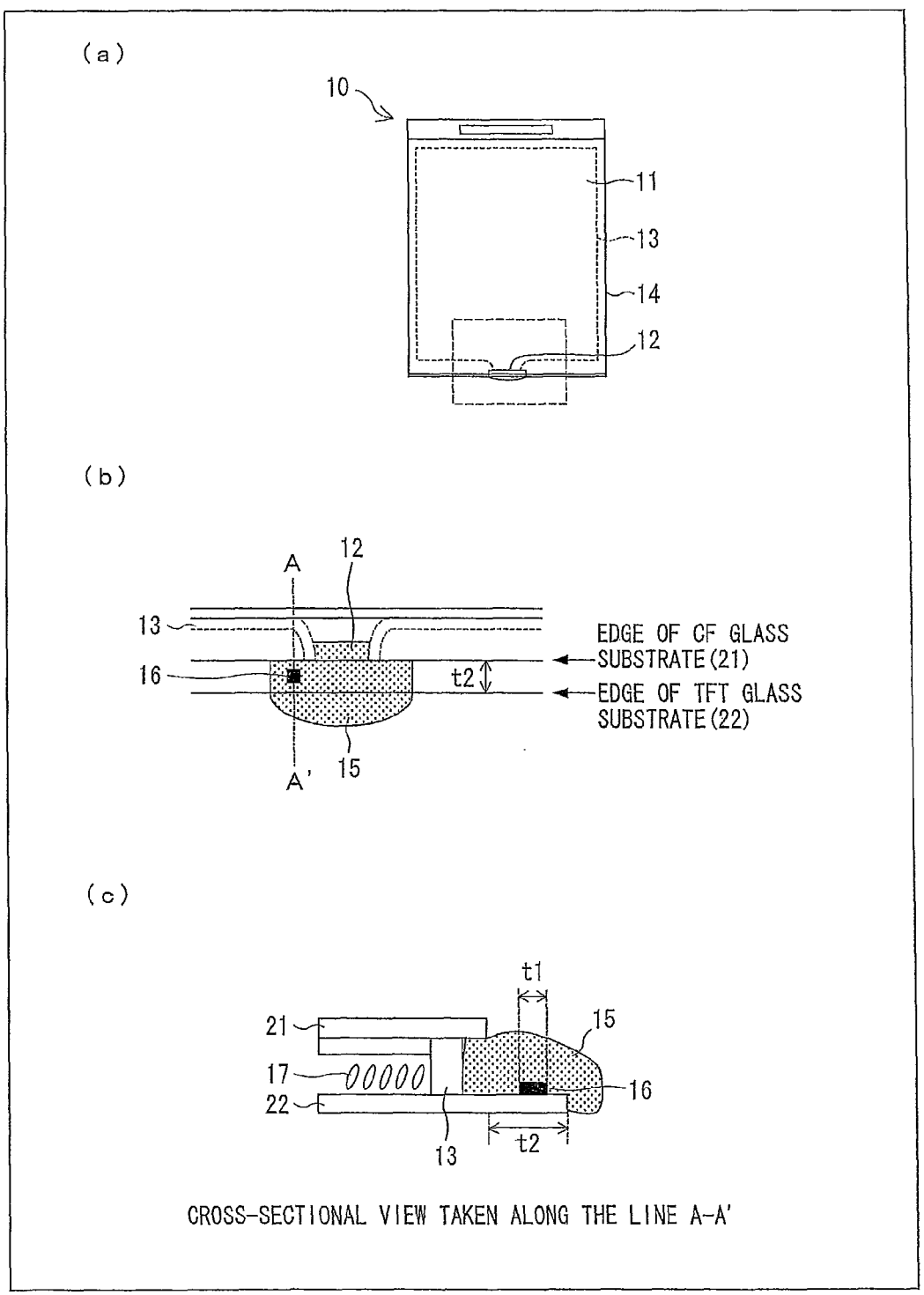
FIG. 1 is illustrations of parts of a configuration of a liquid crystal panel according to an embodiment of the present invention.

FIG. 1 is illustrations of parts of a configuration of a liquid crystal panel. FIG. 1(a) is a diagram illustrating a schematic configuration of the liquid crystal panel, in which a portion enclosed with a dashed line represents a liquid crystal injection port and the periphery thereof. FIG. 1(b) is an enlarged plan view of the portion enclosed with the dashed line of FIG. 1(a). FIG. 1(c) is a cross-sectional view taken along the line A-A' of FIG. 1(b). And FIG. 2 is a flowchart illustrating an example of production processes of the liquid crystal panel.

Figure 2:
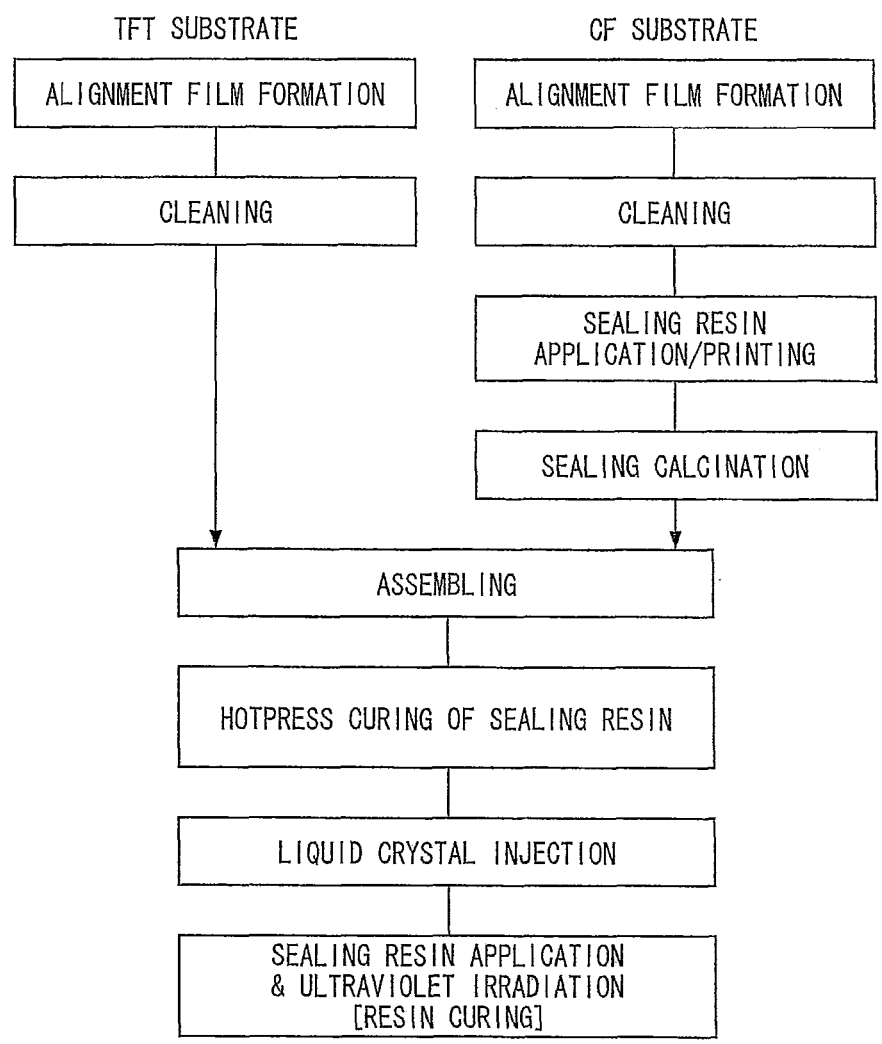
FIG. 2 is an overview flowchart illustrating production processes of the liquid crystal panel.

With reference to FIGS. 1 and 2, the production processes of the liquid crystal panel according to the present embodiment will be briefly explained.

Firstly, alignment films are respectively provided on a pair of substrates that the liquid crystal panel 10 comprises, the pair of substrates being disposed opposite to each other and being, for example, a CF glass substrate 21 on which a color filter and a black matrix are provided, and a TFT glass substrate 22 on which TFT elements are provided. Then, a sealing material 13 is applied/printed on that portion of the CF glass substrate 21, which excludes a liquid crystal injection port 12, and after calcination of the sealing material, the both substrates are assembled together. The liquid crystal injection port 12 is formed outside a display region 11 and inside the outer circumference of the liquid crystal panel 10 (the outer circumference of one of the CF glass substrate 21 and the TFT glass substrate 22, which is larger (which extends further outside)).

And, after the sealing material 13 is heated, for example, by a hot press and cured, liquid crystal is injected from the liquid crystal injection port 12 by means of a vacuum injection method. After the injection of the liquid crystal, a sealing resin 15 is applied to a sealing resin application region located in the vicinity of a liquid crystal injection port 12, using a dispenser, for example, to seal the liquid crystal injection port 12 (a seal process). As the sealing resin 15, an ultraviolet cure acrylate resin is used, for example. Subsequently, the sealing resin 15 is irradiated with ultraviolet and cured. The ultraviolet irradiation dose may be, for example, in a scope of approximately 3000 to 5000 MJ/cm$^2$. With these measures, the liquid crystal panel 10 is produced.

If the sealing resin 15 is not completely cured in the seal process, or the sealing resin 15 contains impurities, the uncured sealing resin or the impurities would gradually diffuse from the liquid crystal injection port 12 into the liquid crystal. This may possibly cause degradation of display performance in the vicinity of the liquid crystal injection port 12. The degradation may lead to local variations of luminance, for example. That is to say, in a conventional production method of the liquid crystal panel 10, the state of cure of the sealing resin 15 could not be checked when the sealing resin 15 is cured, so that the diffusion of the impurities into the liquid crystal could not be prevented.

In the present invention, therefore, an infrared reflector 16 (which will be described in detail later) is provided in a region for applying therein the sealing resin 15, as illustrated in FIG. 1, so that the state of cure of the sealing resin 15 is checked when the sealing resin 15 is cured. Accordingly, immediate measurement of the state of cure of the sealing resin 15 is possible in a nondestructive manner, which enables to promptly give feedback in case of a failure. As a result, even if the sealing resin 15 is not completely cured, for example, in the seal process, preventing proliferation the defect and re-curing the sealing resin 15 that has not completely been cured are possible to prevent the impurities from diffusing into the liquid crystal.

Specifically, infrared is emitted from an analysis apparatus through the sealing resin and reflected by the infrared reflector, and then dispersed by the analysis apparatus, which allows an operator to check the molecular vibration state of the resin and thus the state of cure of the sealing resin and whether or not impurities are incorporated in the sealing resin. As the analysis apparatus, an infrared microscopy system including a Fourier transform infrared spectrophotometer (abbreviated hereinafter as an "FT-IR") may be used.

[A Measurement Method of a Liquid Crystal Panel (A Method for Inspecting a Sealing Resin)]

Figure 3:
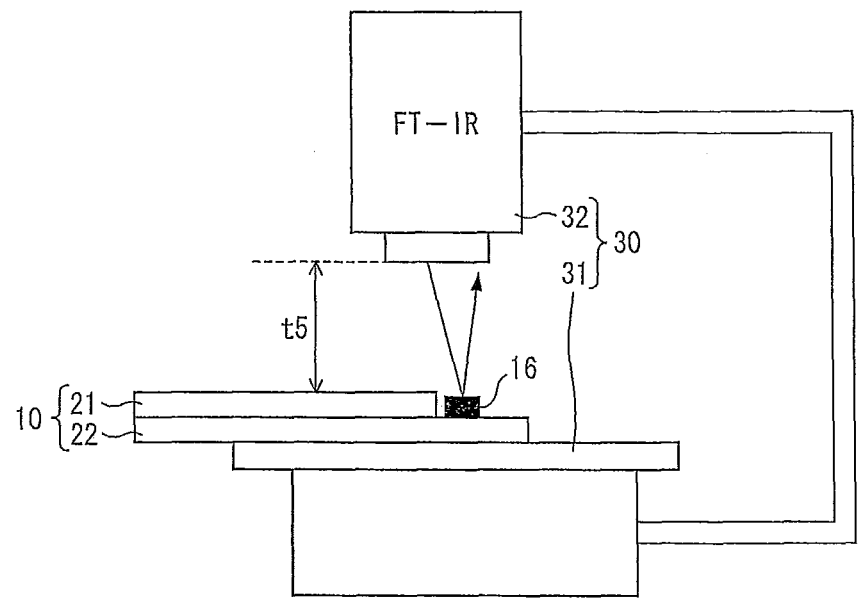
FIG. 3 is a diagram illustrating a case in which the liquid crystal panel illustrated in FIG. 1 is measured by an analysis apparatus (FT-IR).

FIG. 3 is a diagram illustrating a schematic configuration of an infrared microscopy system, a measurement system in which an FT-IR is used to allow an operator to check the state of cure of a sealing resin and whether or not impurities are incorporated therein, the sealing resin being applied to a liquid crystal injection port of a liquid crystal panel.

As illustrated in FIG. 3, the liquid crystal panel 10 is mounted on a stage 31 of the infrared microscopy system 30. And, the position of the stage 31 can be regulated so that infrared from the FT-IR 32 hits at an infrared reflector 16 in the sealing resin (not illustrated). Here, the stage 31 has a length of approximately 20 cm and a width of approximately 13 cm. Even if a substrate to be measured (for example, the liquid crystal panel) has a size larger than that of the stage 31, it would cause no problem as long as the measurement position can be fixed on a place at which the infrared hits.

In the infrared microscopy system 30, a distance t5 between the location from which the infrared is emitted and the target liquid crystal panel to be measured is preferably 1 to 2 cm. The distance may slightly be varied when an operator moves the stage in upward and downward directions, looking through a microscope (when focusing the image).

And, the FT-IR 32 of the infrared microscopy system 30 irradiates the infrared reflector 16 with the infrared and disperses the light reflected by the infrared reflector 16 to analyze the construction of the sealing resin, which allows an operator to check the state of cure of the sealing resin and whether or not impurities are incorporated therein.

In the present embodiment, as a light source of the infrared, an SiC infrared source, in particular, a light from a mid-infrared wavelength range (2.5 μm to 15 μm; wavenumber display: 4000 $cm^{-1}$ to 650 $cm^{-1}$) is used. The intensity of the infrared is preferably set to 5V or more, checked by an interferogram. As long as the wavelength of this range can be measured, a type of the light source is not limited, and, for example, a ceramic light source may be used as the light source. The light source of infrared may be a dual masking type light source, in which an operator regulates the masking size, looking a visible image through a microscope, to determine the measurement region. The detector in the FT-IR 32 is an MCT (mercury-cadmium-tellurium).

Figure 4:
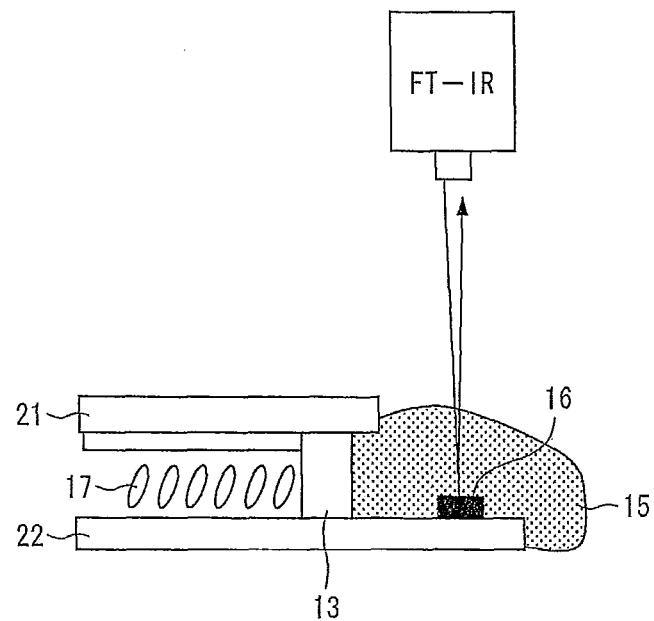
FIG. 4 is an enlarged view of the liquid crystal panel of FIG. 3.

An example will be described with reference to FIGS. 4 to 6, in which the state of cure of the sealing resin and whether or not impurities are incorporated therein are checked by a reflection microscopy method. FIG. 4 is a partial enlarged illustration of FIG. 3. As illustrated in FIG. 4, the infrared from the infrared microscopy system 30 passes through the sealing resin and is reflected at the outer layer of the infrared reflector 16, and then passes again through the resin layer to return to the FT-IR 32 to consequently enter into an MCT detector. An operator measures the infrared using the MCT detector to obtain the spectrum of the sealing resin 15 and checks the internal state of the sealing resin 15.

FIG. 5 is a graph illustrating examples of spectra of the sealing resin 15, the spectra being measured by the infrared microscopy system 30. In FIG. 5, the upper line graph indicates the Good state (OK) of the sealing resin 15 and the lower line graph indicates the No-Good state (NG) of the sealing resin 15.

In the graph, respective peaks of the line graphs indicate vibrational states of molecular bonds, for example, stretching and deformation vibrations of particular molecular bonds such as N—H, O—H, C—H, C=O, and C—O. If the spectrum of the sealing resin (target of measurement) having the good state of cure is registered in advance as a reference spectrum in the FT-IR 32, it is possible to compare the measured spectrum with the reference spectrum so as to easily check the state of cure of the sealing resin to be measured.

Further, as the measurement for the inspection, a sampling test or a 100% test may be conducted.

As described above, the lower line graph of FIG. 5 indicates the no-good state of cure of the sealing resin 15. The two reasons why the measurement results are no-good (why the sealing resin 15 is inadequately cured) are as followed.

One reason is that an irradiation condition with ultraviolet for curing the sealing resin includes some abnormality and thus the sealing resin is not completely cured.

In this case, the sealing resin contains a cured material and an uncured material both of which have the same component. However, when infrared is emitted, a difference in the wavenumber of molecular vibration or absorption intensity of the infrared may occur between the cured material and the uncured material, which results in a difference in spectra obtained from the (completely) cured material and the inadequately cured material.

The other reason is that the sealing resin incorporates impurities. The impurities are considered to be incorporated at the time of the application of the sealing resin using a dispenser, or to be gradually invaded into the resin under the situation in which the resin is inadequately cured.

In this case, the spectrum of the impurities is overlapped with that of the sealing resin to be measured in which the impurities are incorporated, resulting in a composite spectrum of a plurality of components. Accordingly, the obtained spectrum of the sealing resin in which the impurities are incorporated differs from that of the sealing resin in which no impurity is incorporated.

When the measurement result determined shows the good state of cure, the panel is delivered to a post-process, whereas when the measurement result determined shows the no-good state of cure, which is considered that abnormality in the application of the sealing resin or in an ultraviolet device etc. may exist, then the production of the panels to be produced in a same lot is temporarily stopped and the devices are checked (tested).

According to the method, it is thus possible to immediately give feedback in case of a failure, so that a delivery of the panel having a defect to a post-process can be prevented. And, such a method described above for checking the state of cure of the sealing resin or whether or not impurities are incorporated therein can be performed in a nondestructive manner, i.e., without the resin being not touched, so that the liquid crystal panel itself cannot be damaged.

Here, when a sampling test is conducted as a measurement, the product which has a defect may possibly be delivered to a post-process. Accordingly, such an inspection mentioned above may also be performed as a 100% test in the present invention.

Alternatively, the sampling test may be performed among all of the production processes of the liquid crystal panel, if desired.

Figure 6:
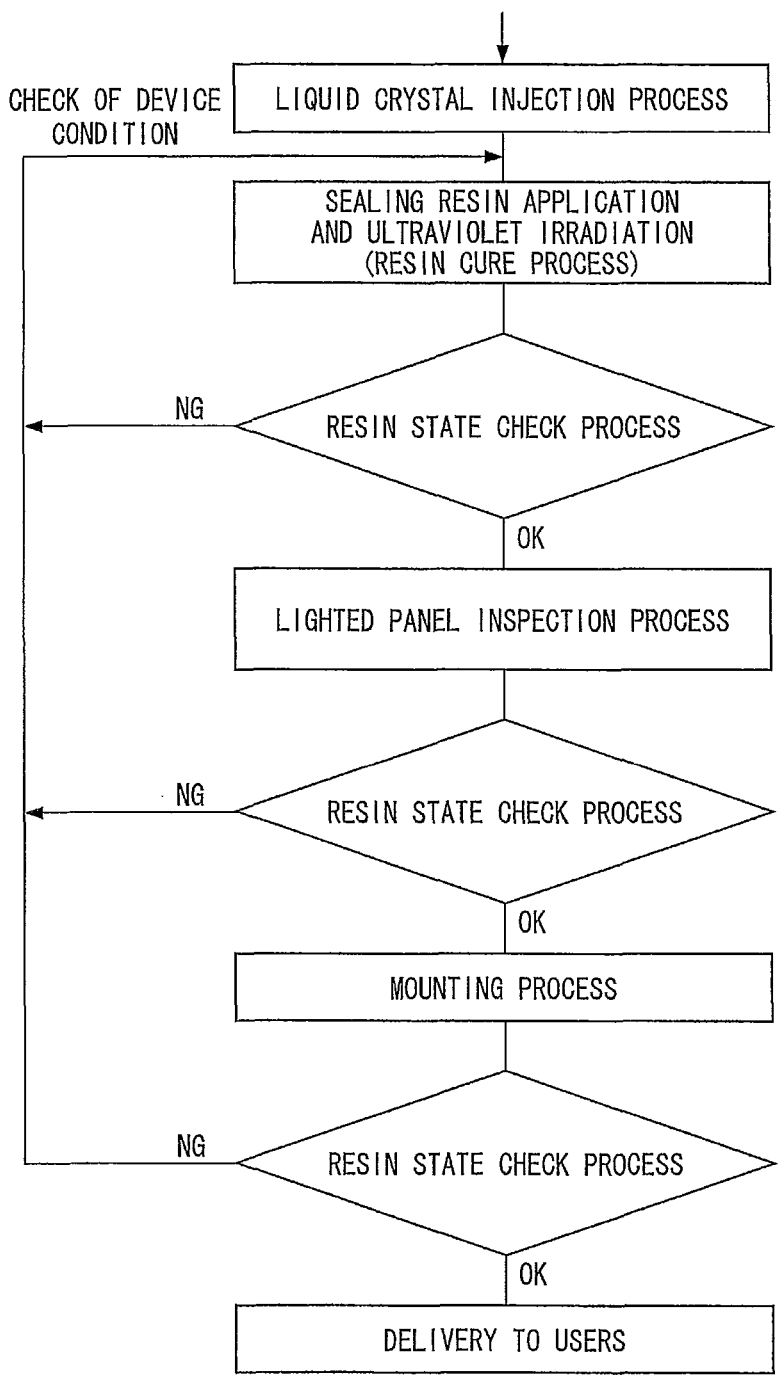
FIG. 6 is a flowchart illustrating measurement processes of the liquid crystal panel.

FIG. 6 is a flowchart illustrating processes after a liquid crystal injection process.

As illustrated in FIG. 6, the above-mentioned check of the state of cure of the sealing resin and whether or not impurities are incorporated therein (a resin state check process) can be performed among all of the production processes of the liquid crystal panel, for example.

In particular, as illustrated in FIG. 6, one resin state check process may follow the resin cure process in which, after liquid crystal is injected from the liquid crystal injection port into a liquid crystal cell region of the liquid crystal panel, a sealing resin is applied to seal the liquid crystal injection port, and the sealing resin is irradiated with ultraviolet for curing the sealing resin. Other resin state check processes may further be performed after a lighted panel inspection process and after a subsequent mounting process.

Here, if all the resin state check process share a spectrum (reference spectrum), which is a spectrum in the good state of cure of the sealing resin to be measured, a (standardized) determination on the basis of the given reference can be made for every process.

When the spectrum obtained from the measurement is not equivalent to the reference spectrum, the determination is made that the liquid crystal panel is a defective product.

When a check result shows the good state of cure, a post-process is continued, whereas when a check result shows the no-good state of cure, feedback is then given to the resin cure process, which is a front-end process, and the production of the device will immediately be stopped and the ultraviolet irradiation condition is inspected (checking of device condition). And the manufacture of the liquid crystal panels in a same lot is temporarily stopped, so that an operator can check the lighted indication and the state of cure of the resin, and then the resin is again irradiated with ultraviolet to be re-cured, if necessary.

More particularly, for example, if a display failure in the vicinity of the liquid crystal injection port is discovered in the lighted inspection process or the mounting process of the liquid crystal panel, and the spectrum of the sealing resin of the liquid crystal panel is measured and is determined to show the no-good state of cure in the resin state check process which follows the lighted inspection process or the mounting process, feedback is given to the resin cure process to immediately stop the manufacture of the device.

Then, the ultraviolet irradiation condition is tested and re-irradiation with ultraviolet is appropriately performed, as described above.

The liquid crystal panel in which a display failure has occurred has to be discarded because even the re-curing cannot improve the display failure, however, the delivery of the defective product to a user can be prevented beforehand.

As state above, since, in the present embodiment, the infrared reflector is provided in a region of the liquid crystal panel for providing therein the sealing resin, an operator can immediately check the state of cure of the sealing resin by means of, for example, a reflection microscopy method.

[Infrared Reflector]

Infrared reflector will be described in detail below, the infrared reflector being provided within the application region of the sealing resin to enable an operator to check the state of cure of the sealing resin of the liquid crystal panel or whether or not impurities are incorporated therein.

Firstly, a method for producing the infrared reflector is described, in which a metal pattern (the infrared reflector 16 in FIG. 1) is provided in any one of a pair of substrates disposed opposite to each other (for example, the CF glass substrate 21 and the TFT glass substrate 22).

An example will be described, in which the metal pattern 16 (infrared reflector) is formed on the TFT glass substrate 22, as illustrated in FIG. 1(b) and FIG. 1(c).

Here, methods for forming the metal pattern 16 may be varied depending on its material, for example. In the present invention, material of the metal pattern may be that of wirings used in the liquid crystal panel. For example, as the metal material of the wirings, a material of gate wirings or source wirings may be used. Accordingly, preparing new metal material is not necessary and thus it is possible to reduce the production cost.

A detailed explanation will be made in this regard. When the metal material for gate wirings is used as that of the metal pattern 16, a W/Ta film (metal pattern) with a length and a width of 50 μm and a thickness of 370 nm/30 nm is formed on the TFT glass substrate with a thickness of 0.7 mm by means of a sputtering method, as illustrated in FIG. 7(a). It is here preferable that, on the metal pattern 16, none of an interlayer insulating film, a protective film (PaS), an organic insulating film, a transparent pixel electrode and an alignment film are provided.

On the other hand, when the metal material for source wirings is used as that of the metal pattern 16, and the metal pattern 16 is formed of the same layer as the pixel electrode (film formation), a W/Ta film (the metal for gate wirings) with a length and a width of 50 μm and thicknesses of 370 nm/30 nm is formed on the TFT glass substrate with a thickness of 0.7 mm by means of a sputtering method, as illustrated in FIG. 7(b). Then, a $SiO_2/SiN/SiO_2$ film (an interlayer insulating film) with thicknesses of 600 nm/250 nm/50 nm is formed on the W/Ta film by means of a CVD method. Subsequently, a Ti/Al/Ti film (metal for source wirings) having thicknesses of 100 nm/350 nm/100 nm is formed on the interlayer insulating film by means of a sputtering method. Therefore, the metal pattern 16 is formed.

It is here preferable that the metal pattern 16 is not covered with any of a protective film (PaS), an organic insulating film, a transparent pixel electrode and an alignment film.

The Ti/Al/Ti film with thicknesses of 100 nm/350 nm/100 nm may directly be formed on the glass substrate by means of a sputtering method.

The reason why any film should not be provided on the formed metal pattern is that, if various films are provided on the metal pattern, an analysis apparatus such as the FT-IR as described above also measures components of the respective films, making it difficult to obtain only the spectrum of the sealing resin.

In order to form the metal pattern mentioned above, it is preferable that the CF glass substrate 21 and the TFT glass substrate 22 differ from each other in size (length), as illustrated in FIG. 1(c).

That is to say, as illustrated in FIG. 1(c), it is preferable that one substrate on which metal pattern is provided, of the two glass substrate that the liquid crystal panel comprises, i.e. the TFT glass substrate 22 and the CF glass substrate 21, has a size (length) greater (longer) than that of the other substrate by 100 μm (t2=100 μm).

Figure 8:
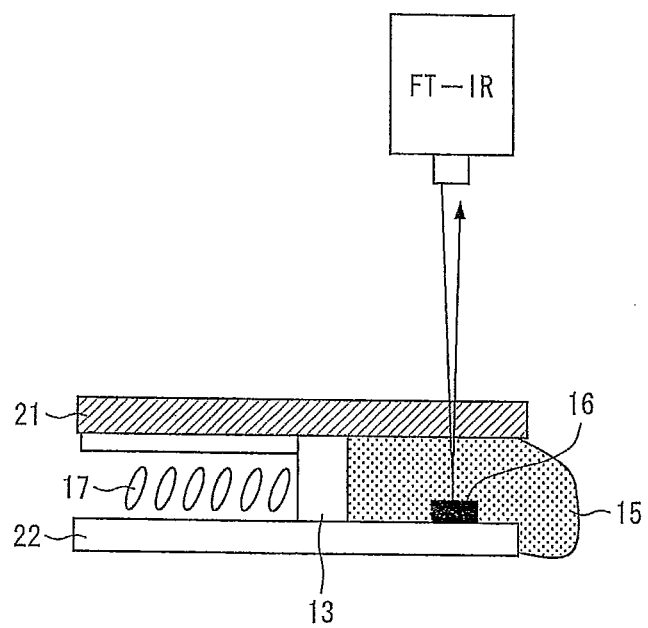
FIG. 8 is a diagram illustrating a case in which substrates that the liquid crystal panel comprises are produced with the same size.

As illustrated in FIG. 8, for example, when the CF glass substrate 21 and the TFT glass substrate 22 are formed with the same length, the metal pattern 16 is covered with the CF glass substrate 21 (the CF glass substrate 21 overlaps with the metal pattern 16, when seen in a plan view). Accordingly, when performing the measurement with an analysis apparatus such as the FT-IR 32, infrared would pass through the glass substrate, as well as through the resin layer. In particular, the infrared, after passing through the CF glass substrate 21, arrives at the sealing resin 15, and then passes through the sealing resin to be hit at the metal pattern 16. Subsequently, the infrared is reflected by the metal pattern 16 to pass through the sealing resin 15 and the CF glass substrate 21 in this order, then entering into the MCT detector of the FT-IR 32.

In this case, the MCT detector detects a spectrum based on the sealing resin 15 and the CF glass substrate 21. In order to extract only the spectrum of the resin component, the spectrum of the glass component must be subtracted from the detected spectrum, which makes the check of the resin state significantly troublesome.

Therefore, it is preferable that the CF glass substrate 21 and the TFT glass substrate 22 have different sizes.

In particular, it is preferable to make the substrate positioned closer to the infrared radiation, of the pair of substrates disposed opposite to each other, smaller than the other substrate on which the metal pattern is formed. This measure makes it easy to manufacture a liquid crystal panel so that the metal pattern is not covered with the substrate. And, since the infrared directly passes through the sealing resin and arrives at the metal pattern in the liquid crystal panel, an analysis using an analysis apparatus such as the FT-IR can easily be performed.

In the present invention, it is not a requirement that the metal pattern is not covered with the glass substrate. It is because, even if the metal pattern is covered with the glass substrate, the spectrum component of the sealing resin can be extracted by subtracting the spectrum of the glass component (compensating the glass component).

The FT-IR, which is an analysis apparatus as described above, has an infrared exit port with a beam diameter of approximately 7 mm to 8 mm. By using such an infrared exit port capable of being narrowed down in beam diameter by a masking technique (aperture), the object to be measured is irradiated with infrared. A Cassegrainian telescope of ×32 is used, in which a masking size of 46 μm×46 μm (an irradiation area with infrared) covers whole elements of 250 μm×250 μm of the MCT detector. This relation can easily be obtained by defining t1, the size of the metal pattern 16, as 50 μm, as illustrated in FIG. 1(c) and FIG. 7.

Further, t2 illustrated in FIG. 1(c) is defined as 100 μm. It is because the infrared microscopy system presently available is generally used for measuring a sample or a micro region having a size equal or smaller than 100 μm. Accordingly, t2 is not limited to the above-mentioned value in the present invention.

Figure 9:
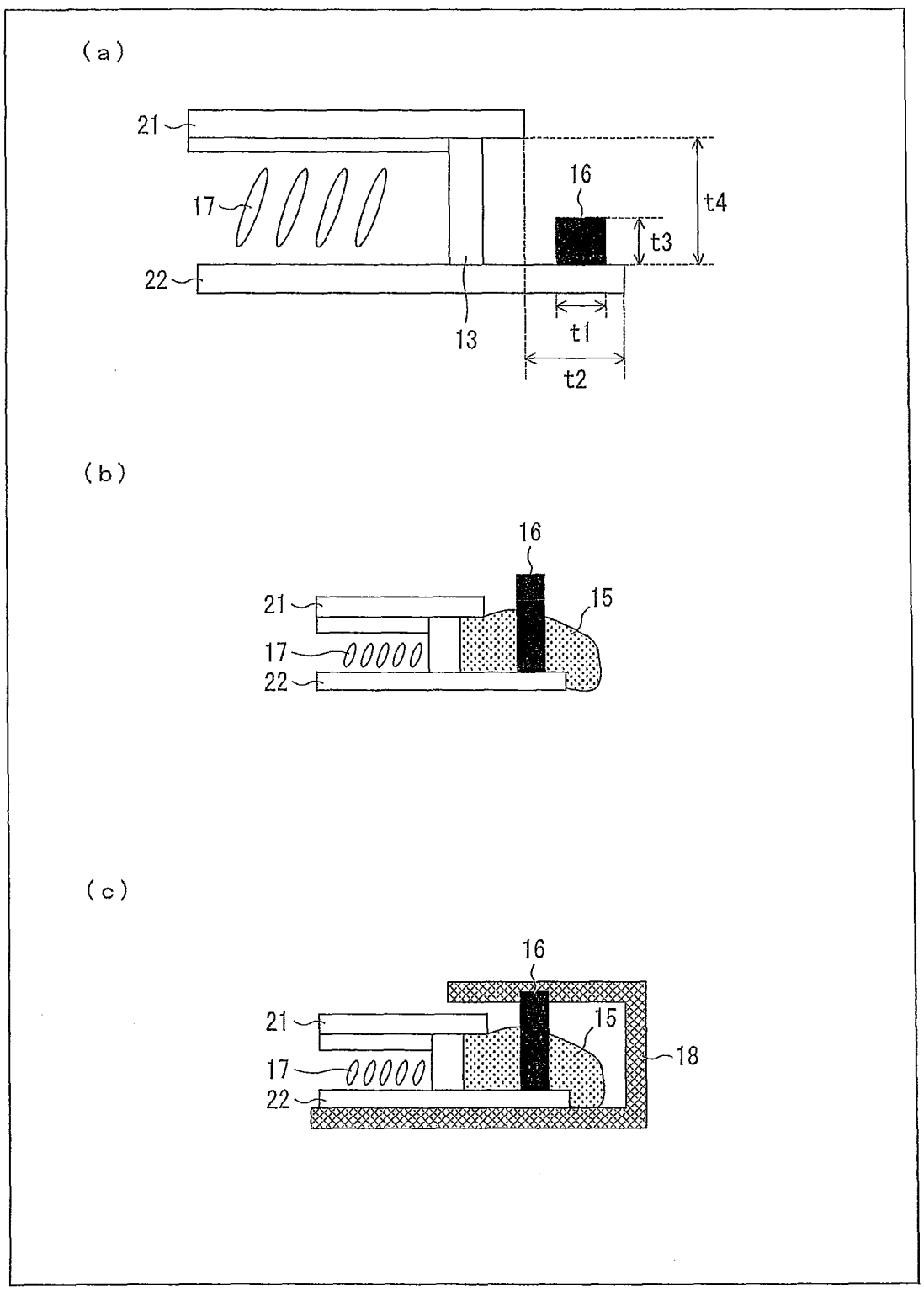
FIG. 9 is illustrations of relations between thickness of the metal pattern and other units.

And a film thickness t3 of the metal pattern 16 does preferably not exceed a gap t4 between the CF glass substrate 21 and the TFT glass substrate 22 that the liquid crystal panel comprises, as illustrated in FIG. 9(a).

For example, the gap t4 between the TFT glass substrate 22 and CF glass substrate of the liquid crystal panel is generally set to approximately 4 μm. In this case, if the film thickness t3 of the metal pattern 16 is set to exceed the gap t4 of 4 μm, the metal pattern 16 is likely not to be covered with the sealing resin 15, as illustrated in FIG. 9(b).

Further, if the metal pattern 16 projects from the CF glass substrate 21, the module unit 18, in particular, a bezel of the module unit 18 is likely to contact with the metal pattern 16 when, for example, a module unit 18 is installed as illustrated in FIG. 9(c).

In addition, the location where the metal pattern 16 is to be disposed is not particularly limited as long as the metal pattern 16 is disposed within the application region of the sealing resin.

Figure 10:
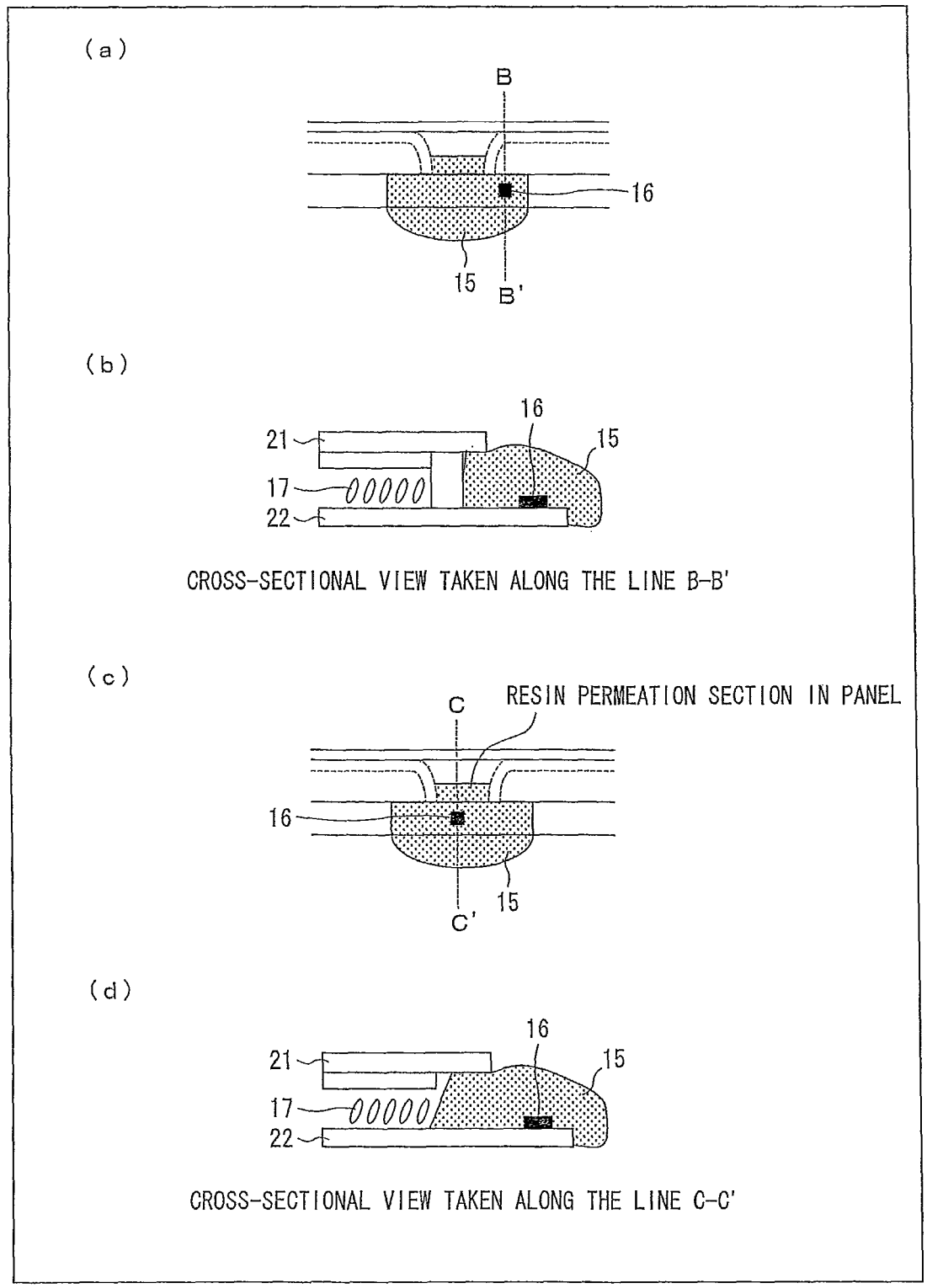
FIG. 10 is illustrations of locations where the metal pattern can be formed.

As illustrated, for example, in FIG. 10(a) and FIG. 10(b) which is a cross-sectional view taken along the line B-B' of FIG. 10, the metal pattern 16 may be disposed not in the vicinity of the center of the liquid crystal injection port 12, but on a location aside of the liquid crystal injection port 12, that is one end of the sealing resin 15, when seen in a plan view of the liquid crystal panel.

Further, as illustrated in FIG. 10(c) and FIG. 10(d) which is a cross-sectional view taken along the line C-C' of FIG. 10(c), the metal pattern 16 may be disposed in the vicinity of the center of the liquid crystal injection port 12, when seen in a plan view of the liquid crystal panel.

Here, in order to facilitate and not prevent, after the application of the sealing resin, the permeation of the resin into the liquid crystal panel, the metal pattern 16 is preferably disposed outside the scope of the opening, such as one end of the sealing resin 15, not within the scope of the opening, such as the vicinity of the center of the liquid crystal injection port 12.

Figure 11:
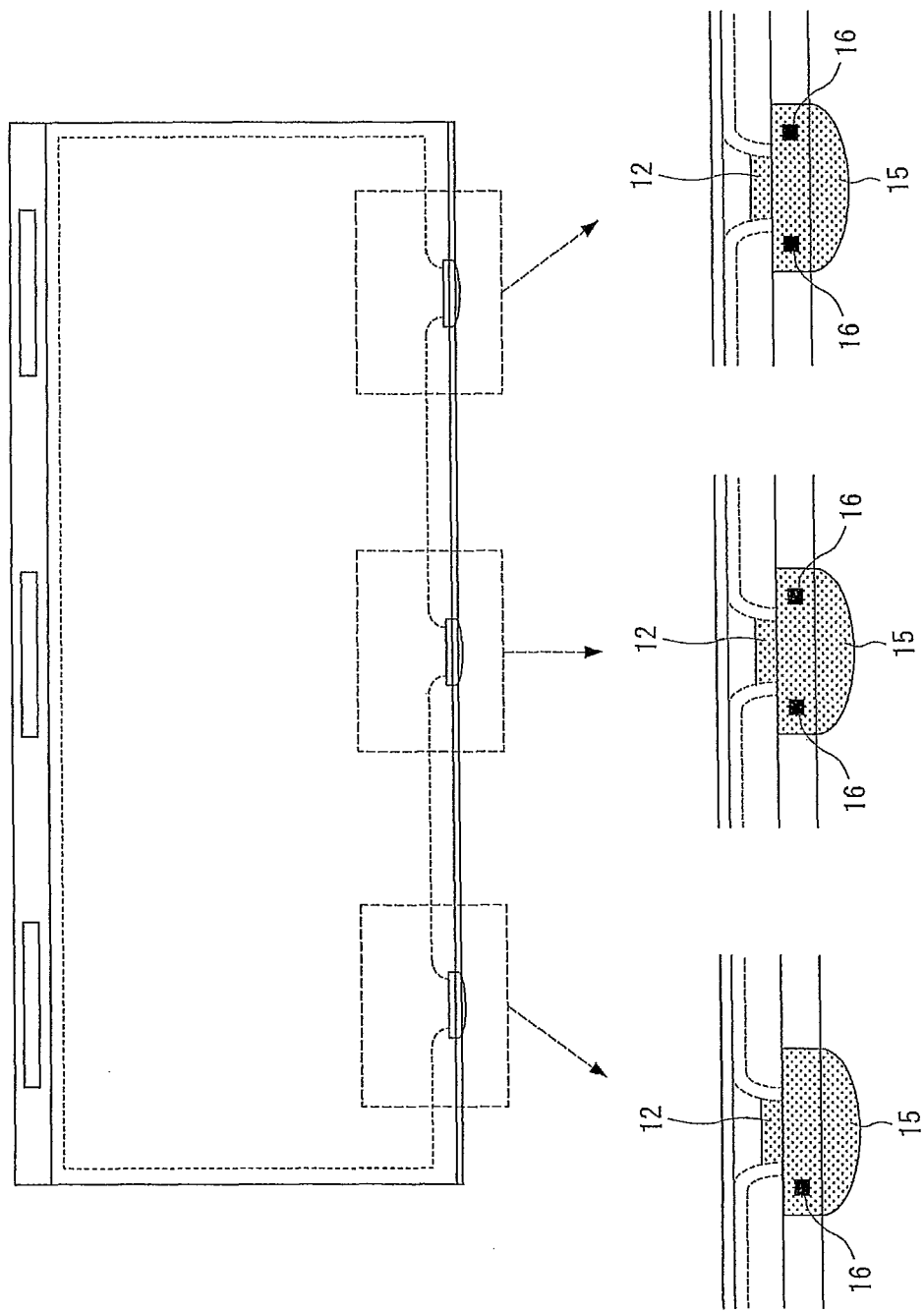
FIG. 11 is an illustration of a case in which a plurality of liquid crystal injection ports are provided on a single liquid crystal panel.

As illustrated in FIG. 11, when a liquid crystal panel includes a plurality of liquid crystal injection ports 12, a plurality of metal patterns 16 may respectively be disposed in regions of the liquid crystal injection ports 12, where the sealing resins 15 are applied. Further, an application region of the sealing resin 15 of one of the liquid crystal injection ports 12 may include a metal pattern 16 disposed in a single location, or a plurality of metal patterns 16 disposed in a plurality of locations.

Figure 12:
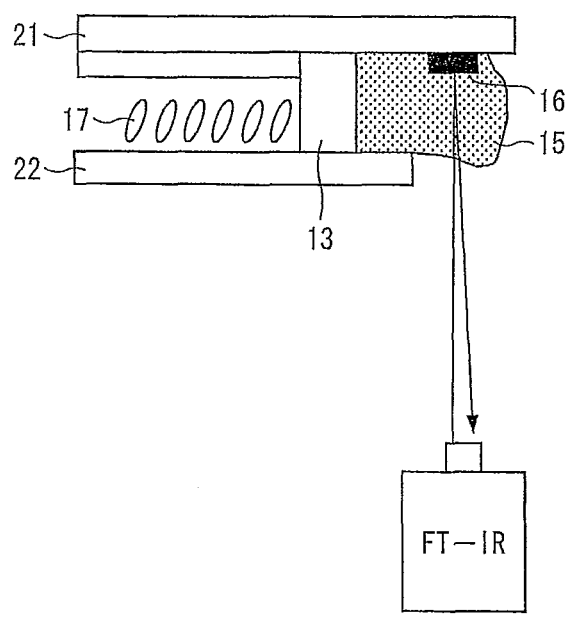
FIG. 12 is an illustration of a liquid crystal panel according to another embodiment of the present invention.
Figure 13:
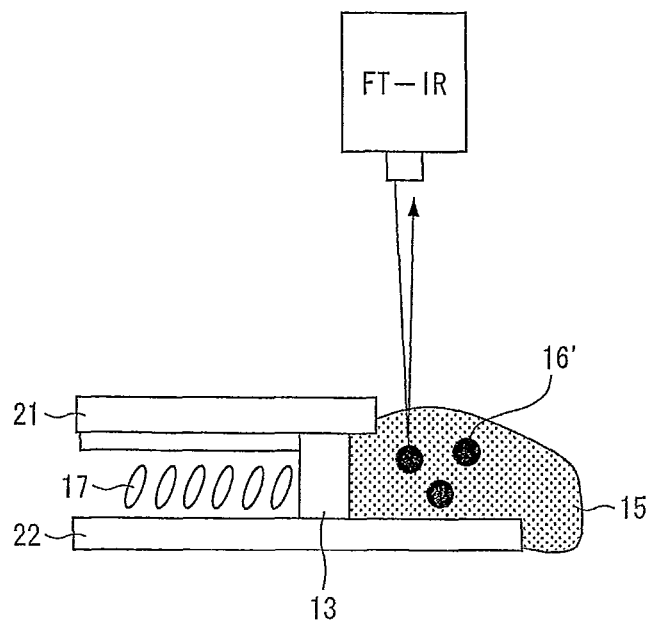
FIG. 13 is an illustration of a liquid crystal panel according to yet another embodiment of the present invention.

FIG. 12 is a diagram illustrating an example in which the metal pattern 16 is provided on the CF glass substrate 21. In this case, it is sufficient that the width of the CF glass substrate 21 is broader than that of the TFT glass substrate 22 by approximately 100 μm. In other words, the liquid crystal panel can be fabricated by assembling the two substrates together in such a way that the edge of the CF glass substrate 21 is extended from that of the TFT glass substrate 22 by approximately 100 μm.

Further, the method for providing the metal pattern on the CF glass substrate, and the material, the size, and the location for the metal pattern may be equivalent to the case described in the former embodiment. That is to say, the location and the like of the metal pattern are not particularly limited as long as the liquid crystal panel has a configuration such that infrared is transmitted through the sealing resin and reflected by the metal pattern.

Further, although the embodiments are described, in which the metal pattern is formed (provided) on any one of the two transparent glass substrates that the liquid crystal panel includes, the reflector which reflects light is not limited to the metal pattern provided for example on any one of the substrates such as a transparent glass substrate and may be any reflector which reflects light emitted from the analysis apparatus and transmitted through the sealing resin, the light then entering into the analysis apparatus to analyzed.

When, for example, as a formation method of the infrared reflector for reflecting infrared, the sealing resin 15 is applied using a dispenser or the like, it may also be possible to incorporate metal particles 16' into the sealing resin 15 in the dispenser beforehand. When analyzing by means of an analysis apparatus such as the FT-IR, the metal particles 16' are irradiated with infrared and reflect the infrared, as with the case of the liquid crystal panel in which the metal pattern is provided. In this way, the spectrum of the sealing resin through which the infrared passes can be obtained.

Further, the number of the metal particles 16' is not limited. It is sufficient that infrared hits at any one of the metal particles 16' and is reflected by it. The material of the metal particles 16' may also be the same metal as used in the production of the liquid crystal panel according to the above-described embodiment.

In addition, after the liquid crystal panel is installed into a module unit, the infrared reflector such as the metal pattern and the metal particles are behind the module unit and thus not viewed from outside. Consequently, the provided infrared reflector cannot be recognized by an ordinary user.

If the liquid crystal display device is disassembled, in particular, the upper bezel is removed, the infrared reflector would be viewed from outside, however, the metal pattern is so small, e.g. about 50 µm×50 µm in size, that it can substantially not be recognized with eyes.

For the reasons described above, the provision of the infrared reflector does not deteriorate visual quality of the liquid crystal panel or the liquid crystal display device including the liquid crystal panel.

Further, the liquid crystal display device is a device in which the liquid crystal panel is incorporated in the module unit or the like to serve as a display section or the like of the device. In particular, the liquid crystal display device may be a liquid crystal television or a liquid crystal monitor.

The present invention is not limited to the above-described respective embodiments, a various variations are possible within the scope of Claims and the embodiments obtained by suitably combining the technical measures respectively disclosed in the different embodiments are included in the technical scope of the present invention.

The liquid crystal panel according to the present invention is characterized in that the infrared reflector is a metal pattern provided on any one of the pair of substrates.

According to the configuration, the infrared reflector is the metal pattern provided on the substrate, so that infrared can easily be reflected in a desired direction.

Consequently, the infrared can surely be detected.

In addition, the liquid crystal panel according to the present invention is characterized in that the metal pattern is provided within a sealing resin application region for applying therein the sealing resin for sealing the liquid crystal injection port.

According to the configuration, the metal pattern is provided within the region for providing therein the sealing resin, so that it becomes easy to surely detect the infrared having transmitted through the sealing resin.

Further, the location where the metal pattern is to be provided is not particularly limited, and the metal pattern may be provided in any location within the region.

The liquid crystal panel according to the present invention is characterized in that the metal pattern is formed outside a display region of the any one of the pair of substrates, when seen in a plan view.

According to the configuration, the metal pattern is formed outside the display region of the any one of the pair of substrates, so that the provision of the metal pattern is not likely to adversely affect display.

Further, the liquid crystal panel according to the present invention is characterized in that the pair of substrates is a TFT glass substrate on which TFT elements are provided and a CF glass substrate on which a color filter is provided, and the metal pattern is formed on the TFT glass substrate.

Further, the liquid crystal panel according to the present invention is characterized in that the TFT glass substrate includes gate wirings and source wirings, and the metal pattern is made of a metal material forming the gate wirings, or a metal material forming the source wirings.

According to the configuration, the metal pattern can easily be formed using the material forming the TFT elements or the wirings connected to the TFT elements.

Further, the liquid crystal panel according to the present invention is characterized in that, in a region where the metal pattern is provided, the pair of substrates does not overlap with each other, when seen in a plan view.

Further, the liquid crystal panel according to the present invention is characterized in that the any one of the pair of substrates, on which the metal pattern is provided, is larger than the other substrate of the pair of substrates.

According to the configuration, in the region where the metal pattern is provided, the substrates do not overlap with each other, so that it becomes easy to detect the infrared, without the infrared being transmitted through one of the substrates.

Therefore, it becomes easy to detect the infrared, which is not varied by the transmission through the substrate, that is to say, only the infrared having transmitted through the sealing resin.

Accordingly, it becomes easy to exactly check the state of cure and the like of the sealing resin.

Further, the liquid crystal panel according to the present invention is characterized in that an organic film is not provided above the metal pattern provided on the any one of the substrates.

According to the configuration, no organic film is provided above the metal pattern.

Hence, it become easy to detect the infrared which is not varied by the transmission through the organic film, that is to say, only the infrared having transmitted through the sealing resin.

Accordingly, it becomes easy to exactly check the state of cure and the like of the sealing resin.

In addition, a film may be formed below the metal pattern, whose material is not limited.

Further, the liquid crystal panel according to the present invention is characterized in that the metal pattern has a film thickness smaller than a gap between the pair of substrates disposed opposite to each other.

According to the configuration, the film thickness of the metal pattern is less than the gap between the substrates, so that it becomes easy to provide the sealing resin on the metal pattern.

Further, because the metal pattern is not likely to contact with the bezel or the like, it becomes easy to install the liquid crystal panel in the liquid crystal module or the like.

Further, the liquid crystal panel according to the present invention is characterized in that the infrared reflector is metal particles incorporated in the sealing resin. According to the configuration, the infrared reflector is metal particles incorporated in the sealing resin, so that the infrared reflector is easily provided without increasing the production process.

Further, the liquid crystal panel according to the present invention is characterized in that the sealing resin is an ultraviolet cure resin.

Further, a liquid crystal display device of the present invention is characterized in that it includes the liquid crystal panel.

Further, the method for inspecting a sealing resin according to the present invention is characterized in that, in the step of measuring the infrared light by using the Fourier transform infrared spectrophotometer, a mid-infrared range having a wavenumber value of 4000 cm$^{-1}$ to 650 cm$^{-1}$ is measured.

Further, a method for inspecting a sealing resin according to the present invention is characterized in that, in the step of measuring by using the Fourier transform infrared spectrophotometer, stretching or deformation vibrations of at least one bond selected from the group consisting N—H, O—H, C—H, C=O and C—O is measured.

Further, a method for inspecting a sealing resin according to the present invention is characterized in that, the infrared light is transmitted through a glass substrate, and in the step of measuring by using the Fourier transform infrared spectrophotometer, the measurement is carried out with compensation on variation caused when the infrared light is transmitted through the glass substrate.

Further, the method for inspecting a sealing resin according to the present invention is characterized in that, the step of measuring the infrared light by using the Fourier transform infrared spectrophotometer determines either or both the state of cure of the sealing resin or/and whether or not impurities are incorporated in the sealing resin.

Further, the method for inspecting a sealing resin according to the present invention is characterized in that comparing (a) the infrared light measured by the Fourier transform infrared spectrophotometer with (b) infrared light transmitted through a sealing resin (i) in which no impurity is incorporated and (ii) which has the good state of cure, so as to determine either or both the state of cure of the sealing resin or/and whether or not impurities are incorporated in the sealing resin.

INDUSTRIAL APPLICABILITY

The present invention is suitably applicable to a liquid crystal display device, in which the state of cure of the sealing resin or whether or not impurities are incorporated therein is checked as an element for maintaining the quality of the liquid crystal panel. In addition to the liquid crystal panel, the present invention is applicable to a variety of device produced by a method including a process for curing an organic film.

REFERENCE SIGNS LIST

10 Liquid crystal panel
11 Display region
12 Liquid crystal injection port
13 Sealing material
14 Liquid crystal cell region
15 Sealing resin
16 Metal pattern (Infrared reflector)
16' Metal particle (Infrared reflector)
17 Liquid crystal
18 Module unit
21 CF glass substrate
22 TFT glass substrate
30 Infrared microscopy system
31 Stage
32 FT-IR

The invention claimed is:
1. A liquid crystal panel comprising:
a pair of substrates disposed opposite to each other;
an liquid crystal injection port for injecting liquid crystal between the pair of substrates; and
an infrared reflector capable of reflecting infrared;
the infrared reflector being provided in a region for providing therein a sealing resin for sealing the liquid crystal injection port,
wherein the infrared reflector is a metal pattern provided on any one of the pair of substrates, and
wherein the pair of substrates is a TFT glass substrate on which TFT elements are provided and a CF glass substrate on which a color filter is provided, and
the metal pattern is formed on the TFT glass substrate.
2. The liquid crystal panel as set forth in claim 1, wherein:
the metal pattern is provided within a sealing resin application region for applying therein the sealing resin for sealing the liquid crystal injection port.
3. The liquid crystal panel as set forth in claim 1, wherein:
the metal pattern is formed outside a display region of the any one of the pair of substrates, when seen in a plan view.
4. The liquid crystal panel as set forth in claim 1, wherein:
the TFT glass substrate includes gate wirings and source wirings, and
the metal pattern is made of a metal material forming the gate wirings, or a metal material forming the source wirings.
5. The liquid crystal panel as set forth in claim 1, wherein:
in a region where the metal pattern is provided, the pair of substrates does not overlap with each other, when seen in a plan view.
6. The liquid crystal panel as set forth in claim 1, wherein:
the any one of the pair of substrates, on which the metal pattern is provided, is larger than the other substrate of the pair of substrates.
7. The liquid crystal panel as set forth in claim 1, wherein:
an organic film is not provided above the metal pattern provided on the any one of the substrates.
8. The liquid crystal panel as set forth in claim 1, wherein:
the metal pattern has a film thickness smaller than a gap between the pair of substrates disposed opposite to each other.
9. The liquid crystal panel as set forth in claim 1, wherein:
the infrared reflector is metal particles incorporated in the sealing resin.
10. The liquid crystal panel as set forth in claim 1, wherein:
the sealing resin is an ultraviolet cure resin.
11. A liquid crystal display device comprising a liquid crystal panel as set forth in claim 1.
12. A method for inspecting a sealing resin provided to seal a liquid crystal injection port of a liquid crystal panel including a pair of substrates disposed opposite to each other; and the liquid crystal injection port for injecting liquid crystal between the pair of substrates,
the method comprising the step of:
measuring infrared light by using a Fourier transform infrared spectrophotometer, the infrared light being transmissive through the sealing resin and being reflected by an infrared reflector capable of reflecting infrared, the infrared reflector being provided in a region for providing therein the sealing resin for sealing the liquid crystal injection port,
wherein the infrared light is transmitted through a glass substrate, and
in the step of measuring by using the Fourier transform infrared spectrophotometer, the measurement is carried out with compensation on variation caused when the infrared light is transmitted through the glass substrate.
13. The method for inspecting a sealing resin as set forth in claim 12, wherein:

in the step of measuring the infrared light by using the Fourier transform infrared spectrophotometer, a mid-infrared range having a wavenumber value of 4000 cm-1 to 650 cm-1 is measured.

14. The method for inspecting a sealing resin as set forth in claim 12, wherein:
in the step of measuring by using the Fourier transform infrared spectrophotometer, stretching or deformation vibrations of at least one bond selected from the group consisting N—H, O—H, C—H, C═O and C—O is measured.

15. The method for inspecting a sealing resin as set forth in claim 12, wherein:
the step of measuring the infrared light by using the Fourier transform infrared spectrophotometer determines either or both the state of cure of the sealing resin or/and whether or not impurities are incorporated in the sealing resin.

16. The method for inspecting a sealing resin as set forth in claim 12, comprising the step of:
comparing (a) the infrared light measured by the Fourier transform infrared spectrophotometer with (b) infrared light transmitted through a sealing resin (i) in which no impurity is incorporated and (ii) which has the good state of cure, so as to determine either or both the state of cure of the sealing resin or/and whether or not impurities are incorporated in the sealing resin.

* * * * *